United States Patent
Whaley et al.

(10) Patent No.: US 9,600,683 B1
(45) Date of Patent: *Mar. 21, 2017

(54) PROTECTING DATA IN INSECURE CLOUD STORAGE

(71) Applicant: OPEN INVENTION NETWORK LLC, Durham, NC (US)

(72) Inventors: John Whaley, Fremont, CA (US); Thomas Joseph Purtell, II, Menlo Park, CA (US); Geoffrey G. Thomas, San Francisco, CA (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,422

(22) Filed: Jul. 12, 2016

Related U.S. Application Data

(63) Continuation of application No. 14/143,328, filed on Dec. 30, 2013, now Pat. No. 9,390,281.

(51) Int. Cl.
*G06F 21/62* (2013.01)
*H04L 29/06* (2006.01)
*G06F 17/30* (2006.01)
*H04L 29/08* (2006.01)
*H04L 9/32* (2006.01)

(52) U.S. Cl.
CPC .... *G06F 21/6218* (2013.01); *G06F 17/30115* (2013.01); *G06F 17/30174* (2013.01); *G06F 17/30377* (2013.01); *H04L 9/3242* (2013.01); *H04L 9/3247* (2013.01); *H04L 63/0442* (2013.01); *H04L 63/08* (2013.01); *H04L 63/0823* (2013.01); *H04L 63/20* (2013.01); *H04L 67/1095* (2013.01); *H04L 2463/121* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,082,316 | B2* | 12/2011 | Rakowski | G06F 9/44505 709/203 |
| 2011/0066668 | A1* | 3/2011 | Guarraci | G06F 17/30233 707/831 |
| 2014/0281526 | A1* | 9/2014 | Lindteigen | H04L 63/0442 713/168 |
| 2015/0074407 | A1* | 3/2015 | Palmeri | H04L 63/166 713/171 |

* cited by examiner

*Primary Examiner* — Beemnet Dada
(74) *Attorney, Agent, or Firm* — Haynes and Boone, LLP

(57) ABSTRACT

The disclosed embodiments provide a system that processes data. The system includes a first client that encrypts a first set of data, uploads the encrypted first set of data to a volume on a cloud storage system, and creates a commit record of the upload. The system also includes a synchronization server that verifies access to the volume by the first client and includes the commit record in a change set containing a set of commit records associated with the volume. The synchronization server also signs the change set and provides the change set for use in synchronizing the upload with a second client.

25 Claims, 8 Drawing Sheets

PROTECTING DATA IN INSECURE CLOUD STORAGE

RELATED APPLICATION

This application is a continuation of U.S. patent application Ser. No. 14/143,328, filed Dec. 30, 2013, entitled "PROTECTING DATA IN INSECURE CLOUD STORAGE," issued as U.S. Pat. No. 9,390,281 on Jul. 12, 2016. The subject matter of this application is related to commonly assigned U.S. patent application Ser. No. 12/435,279, filed May 4, 2009, entitled "Policy-Based Layered Filesystem Management,". The subject matter of this application is also related to commonly assigned U.S. patent application Ser. No. 12/729,370, filed Dec. 28, 2012, entitled "Separate Cryptographic Keys for Protecting Different Operations on Data," issued as U.S. Pat. No. 8,095,330 on Jan. 10, 2012.

BACKGROUND

Field

The disclosed embodiments relate to cloud storage. More specifically, the disclosed embodiments relate to techniques for protecting data in insecure cloud storage.

Related Art

Data on network-enabled electronic devices is frequently stored, shared, and/or backed up using remote storage mechanisms such as file hosting services, cloud storage services, and/or remote backup services. For example, a user may use a cloud storage service to store and/or back up a file on a personal computer, laptop computer, portable media player, personal digital assistant, tablet computer, and/or mobile phone. After the file is uploaded to the cloud storage service, the user may retrieve the file and/or share the file with other users from the cloud storage service.

However, storage of data on untrusted remote storage mechanisms may be associated with a number of security issues. First, the data may be accessed by an unauthorized third party, thus compromising the confidentiality of the data. For example, the data may be obtained by an attacker if the attacker steals authentication credentials for accessing the data on cloud storage and/or reads packets containing the data during writing of the data to cloud storage and/or reading of the data from cloud storage.

Second, the unauthorized third party may compromise the integrity of the data by modifying and/or tampering with the data. For example, an attacker may inject packets into a network connection between a user writing the data and cloud storage, resulting in storing of the packets' payloads with the data on the cloud storage and/or subsequent reading of the stored payloads from the cloud storage by the user and/or other users.

Hence, use of untrusted remote storage mechanisms may be facilitated by securing both the storage of data on the remote storage mechanisms and the transmission of the data between the remote storage mechanisms and network-enabled electronic devices.

SUMMARY

The disclosed embodiments provide a system that processes data. The system includes a first client that encrypts a first set of data, uploads the encrypted first set of data to a volume on a cloud storage system, and creates a commit record of the upload. The system also includes a synchronization server that verifies access to the volume by the first client and includes the commit record in a change set containing a set of commit records associated with the volume. The synchronization server also signs the change set and provides the change set for use in synchronizing the upload with a second client.

In some embodiments, the system also includes the second client. The second client may obtain the signed change set from the synchronization server and verify a set of signatures in the change set. Next, the second client may use the commit record from the change set to update a local data state and add a download of the first set of data to a download queue.

In some embodiments, the second client also obtains the download from the download queue and uses a path from the download to download the encrypted first set of data from the volume. Next, the second client decrypts and verifies the first set of data and writes the first set of data to a file on a local filesystem.

In some embodiments, upon detecting an existing version of the file on the local filesystem, the second client also opens the existing version with exclusive write access and obtains one or more file attributes for the existing version. If the one or more file attributes have not changed, the second client replaces the existing version with the first set of data. If the one or more file attributes have changed, the second client places the download back in the download queue.

In some embodiments, the system also includes a management server that provides a set of digital certificates for validating a set of keys used by the first client and the synchronization server and provides an access control policy associated with access to the volume by the first and second clients.

In some embodiments, the set of keys includes a first key used by the first client to encrypt the data and a second key used by the synchronization server to sign the change set.

In some embodiments, the synchronization server also notifies the first client of a conflict between the uploaded first set of data and a second set of data in the volume.

In some embodiments, the first client resolves the conflict.

In some embodiments, resolving the conflict involves downloading the second set of data from the cloud storage system to a local filesystem and renaming the first set of data in the local filesystem.

In some embodiments, the commit record includes a hash-based message authentication code (HMAC) of a path associated with the data, a previous state of the data, a current state of the data, metadata for the data, a digital signature from the first client, and a timestamp.

In some embodiments, the change set includes a set of signed commit records, an identifier for the volume, a change set identifier, a digital signature from the synchronization server, and a timestamp.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
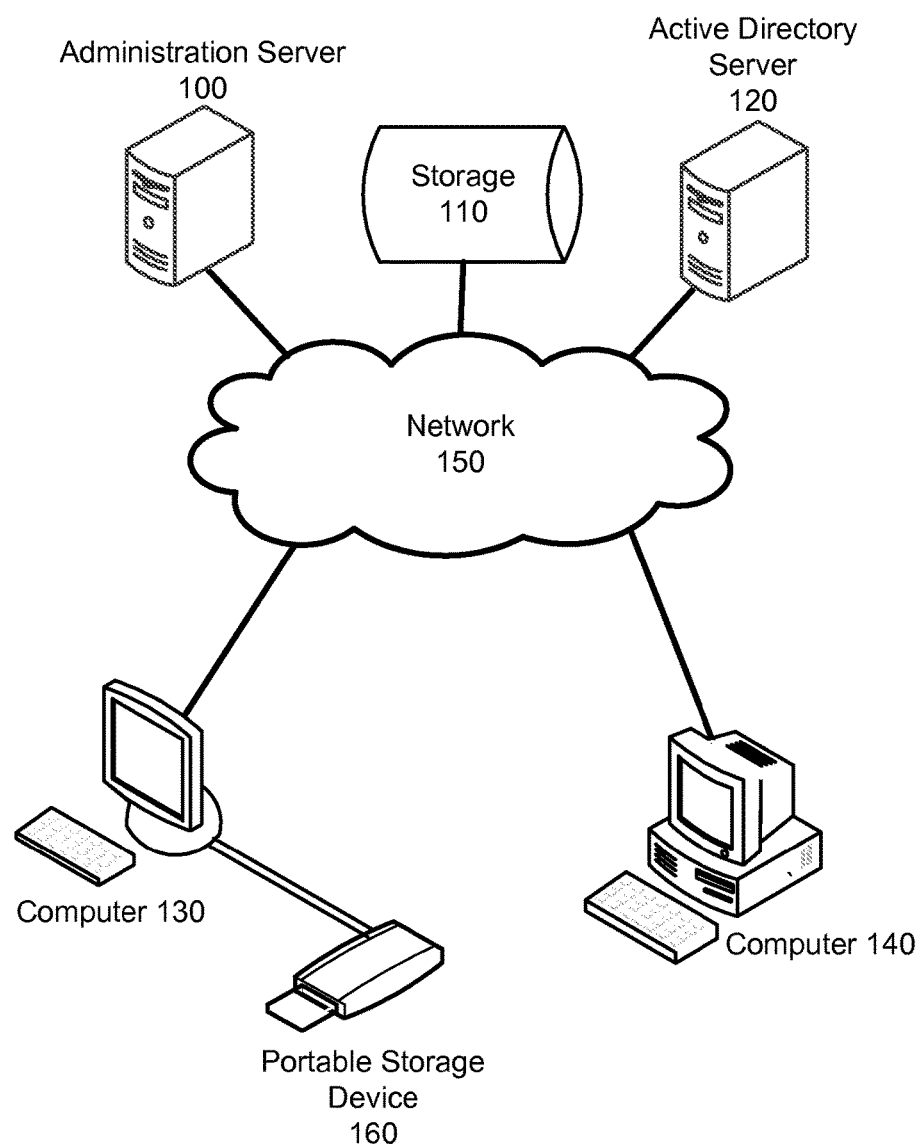
FIG. 1 shows a schematic of a system in accordance with the disclosed embodiments.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic devices that may be used to perform tasks for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication among devices (e.g., administration server 100, storage 110, active directory server 120, computers 130-140) connected to network 150. For example, computers 130-140 may operate as clients in network 150 and allow users of computers 130-140 to send and receive email s, retrieve web pages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels, and VirtualBox (VirtualBox™ is a registered trademark of Oracle America, Inc.) may be used to provide these capabilities.

In one or more embodiments, the system of FIG. 1 enables the central management and local execution of virtual computing environments. Such central management and local execution may allow the virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc., a Delaware corporation). In particular, the MokaFive Player may be used with computers 130-140 to locally execute a centrally defined and managed virtual computing environment according to rules and access controls defined in the MokaFive Server.

Administration server 100 may be a server that supports centralized definition of virtual computing environments and management of access and permissions to the same for local execution. For example, administration server 100 may be provided by the MokaFive Server. Administration server 100 may itself execute in a virtual computing environment, such as a VMware ESX environment. An administrator of virtual computing environments for computers 130-140 may create, configure, and delete the virtual computing environments by interacting with administration server 100 through a management interface (e.g., graphical user interface (GUI), web-based user interface, etc.) provided by administration server 100.

Active directory server 120 may provide network-based directory services. For example, active directory server 120 may be a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

To access the virtual computing environments, each computer 130-140 may include one or more subscriptions to virtual computing environments stored in storage 110. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

In one or more embodiments, virtual computing environments on computers 130-140 are stored in layered filesystems. The layered filesystems may separate different components of the virtual computing environments into individually managed layers based on policies for the layered filesystems. In one or more embodiments, each layered filesystem includes a system layer that stores an image of a virtual computing environment obtained from storage 110 and/or administration server 100. The layered filesystem may also include an application layer for storing user-installed applications, as well as a user data layer for storing user-specific documents and settings.

The layered filesystems may further facilitate the management of the virtual computing environments by enabling individual layers to be added, removed, temporarily disabled, and/or restored. In particular, the system layer may be periodically populated with a new image of the virtual computing environment from storage 110 and/or administration server 100. As a result, computers 130-140 may always execute the most up-to-date versions of the virtual computing environments. Furthermore, the application layer may be removed or temporarily disabled if a virus or malfunctioning application is installed in the application layer. Snapshots or backups of individual layers may additionally enhance the security, reliability, and integrity of the virtual computing environments. Management and execution of virtual computing environments using layered filesystems is described in a co-pending non-provisional application by inventors Thomas Joseph Purtell II and John Whaley, entitled "Policy-Based Layered Filesystem Management," having Ser. No. 12/435,279, and filing date 4 May 2009, which is incorporated herein by reference.

As described in the above-referenced applications, data created using a virtual computing environment may be stored in a separate layer of a filesystem than the operating system and/or applications in the virtual computing environment. The data may also be stored and/or backed up on network-based storage (e.g., storage 110) to enable recovery of the data and/or access to the data outside the virtual computing environment. For example, the data may be an image, document, audio, video, and/or other type of file that is created on and/or used with a virtual computing environment. Moreover, saving of the data within the virtual computing environment may cause the data to be transmitted from the virtual computing environment to cloud storage. The data may then be persisted on the cloud storage and/or downloaded to electronic devices that are authorized to access the data.

However, cloud storage may be untrusted and/or insecure, thus exposing the data to increased risk of unauthorized access and/or tampering. Continuing with the above example, an attacker may intercept and/or modify the data during transmission of the data from the virtual computing environment to the cloud storage (e.g., during "writing" of the data to the cloud storage) and/or from the cloud storage to an electronic device authorized to access the data (e.g., during "reading" of the data from the cloud storage). Alternatively, the attacker may gain access to the stored data by obtaining authentication credentials for a user account associated with the data on the cloud storage and providing the authentication credentials to the cloud storage.

In one or more embodiments, access to and/or storage of data on untrusted and/or third-party cloud storage is secured by encrypting the data before the data is transmitted (e.g., written) to the cloud storage and decrypting the data after the data is obtained (e.g., read) from the cloud storage. In addition, the data may be encrypted and decrypted on clients uploading the data to the cloud storage and downloading the data from the cloud storage, respectively. Coordination between multiple clients accessing the same data may be handled by a scalable, untrusted synchronization server, which may avert bandwidth constraints associated with routing traffic to the cloud storage through a central server for encryption and decryption. Such encryption and synchronization of data may enable secure, scalable use of a third-party cloud storage system in storing and synchronizing data for a set of client devices, as discussed in further detail below with respect to FIG. 2.

Figure 2:
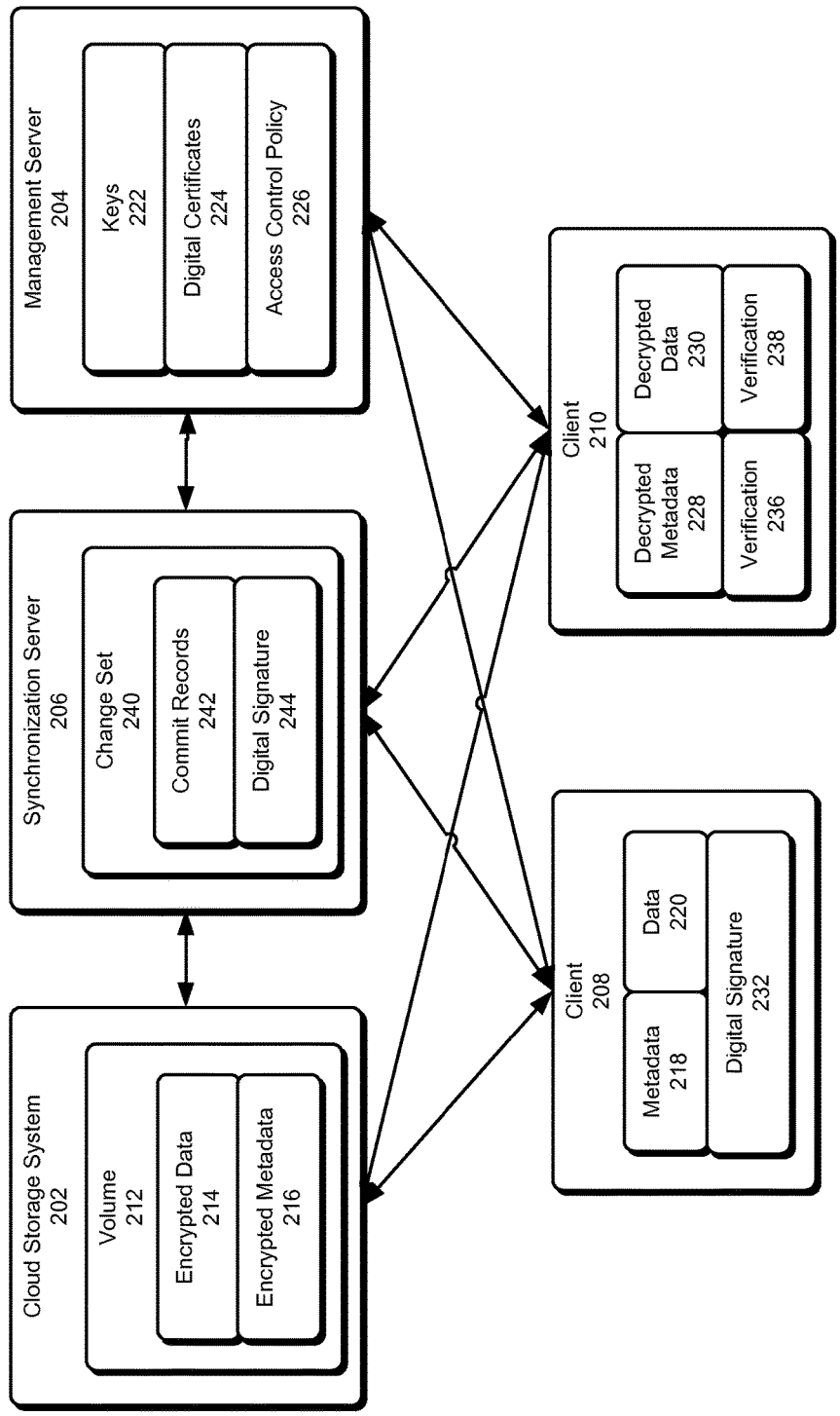
FIG. 2 shows a system for processing data in accordance with the disclosed embodiments.

FIG. 2 shows a system for processing data 220 in accordance with the disclosed embodiments. More specifically, FIG. 2 shows a system for protecting and synchronizing data 220 during use of data 220 with a potentially insecure cloud storage system 202 and/or other network-based storage mechanism.

During synchronization of data 220, data 220 may be written to cloud storage system 202 by a first client 208 and read from cloud storage system 202 by a second client 210. For example, clients 208-210 may be personal computers, laptop computers, tablet computers, mobile phones, personal digital assistants, portable media players, and/or other network-enabled electronic devices of one or more users in an organization. Cloud storage system 202 may be used by the organization for backup and synchronization of the users' corporate data (e.g., data 220). This data may include the users' home directories (including desktops) on corporate-owned electronic devices and/or one or more directories on a personally owned electronic device used for corporate work. As described above, the data may also be obtained from virtual computing environments running on the electronic devices. Synchronization of the data may include the following use cases: keeping data easily accessible in case a single device is serially replaced (e.g., lost or upgraded), keeping data accessible on another device (e.g., a personally owned machine or mobile device) in parallel, and sharing a directory within the organization for collaboration (e.g., multiple writers) or internal publishing (e.g., few writers, many readers) purposes.

Those skilled in the art will appreciate that the organization may use cloud storage system 202 to avoid deploying additional infrastructure within the organization's premises or data center. Such use of cloud storage system 202 may be motivated both by the costs of system maintenance and administration and by the availability of cloud services to distribute resources across the Internet. Moreover, users in modern enterprise organizations may be geographically dispersed and mobile, with many users working from outside of the organizations' physical walls (e.g., from home, on the road, from a branch office, etc.).

Conversely, an organization that wishes to secure its data may not want to rely on a third-party provider to encrypt the data. As a result, the organization may set up one or more servers within the organization's corporate network to encrypt data before uploading the data to cloud storage. However, such centralized encryption may require the data to enter and leave the corporate network on the way to and from the cloud storage, even if clients accessing the data are remote. Thus, scalability of the centralized encryption mechanism may be constrained by the number of servers set up by the organization.

In one or more embodiments, the system of FIG. 2 enables scalable use of a third-party cloud storage system 202 in storing and synchronizing data for clients 208-210 and/or other clients associated with a group or organization. In particular, the system may configure clients 208-210 to communicate directly with cloud storage system 202 in uploading or downloading data. Operations by clients 208-210 with cloud storage system 202 may be synchronized using a synchronization server 206, and encryption and verification of data and/or operations may be enabled using a management server 204. Each of the components of the system of FIG. 2 is described in further detail below.

Cloud storage system 202 may store data 220 from client 208 and/or other clients as encrypted data 214. Cloud storage system 202 may also store encrypted metadata 216 in the form of one or more encrypted, signed change sets (e.g., change set 240) from synchronization server 206. The change sets may be created by synchronization server 206 from commit records 242 of changes to encrypted data 214 on cloud storage system 202 by clients 208-210, as discussed below. Clients 208-210 may directly access cloud storage system 202 to upload and download encrypted data 214 and/or download new change sets.

In one or more embodiments, files are used as the basic unit of synchronization among clients 208-210 and cloud storage system 202. Each file may be synchronized, versioned, and updated independently, and conflicts may be flagged on a per-file basis. The file may also be named by the hash-based message authentication code (HMAC) of the file's complete path.

File contents may be split into "chunks" to support content addressability. Each chunk may be uniquely identified by a pathname, a hash of the chunk's content, and an uncompressed length. The chunk may then be stored encrypted as encrypted data 214 on cloud storage system 202. The chunk may also be compressed before uploading to cloud storage system 202.

In one or more embodiments, access to data and/or metadata on cloud storage system 202 is based on one or more volumes (e.g., volume 212) on cloud storage system 202. Each volume may be a collection of synchronized files and directories with the same access control permissions. The volume may also be associated with a separate set of settings, quota, cloud storage location, and/or synchronization server (e.g., synchronization server 206). For example, each user may be associated with a public and private volume; the public volume may be accessible to other users according to an access control policy 226 provided by management server 204, and the private volume may only be accessible to the user. An individual client 208-210 may have no access, read-only access, and/or read-write access to a volume.

Volumes may also be used as units of administrative control, so that consistency is per-volume. By configuring each synchronization server (e.g., synchronization server 206) to be responsible for writes to a single volume, multiple synchronization servers may be scaled without requiring distributed consistency. Large volumes may also be spread across multiple synchronization servers and cloud storage backends (e.g., cloud storage system 202) via sharding within each volume (e.g., using a hash of the file path as a shard key).

Synchronization server 206 may be a scalable, untrusted component that runs on hosting infrastructure associated with cloud storage system 202. Alternatively, synchronization server 206 may run within the corporate network if cloud hosting is unavailable or undesirable. Synchronization server 206 may track the latest state of files and/or other data on cloud storage system 202, process commit operations from clients 208-210, flag conflicting commit operations, write and combine change sets (e.g., change set 240) containing multiple commit records 242 representing the commit operations, and notify clients 208-210 of change set updates (e.g., via a push mechanism).

In one or more embodiments, each commit record of uploaded data includes an HMAC of a path associated with the data, a previous state of the data (e.g., a list of chunks before the upload), a current state of the data (e.g., a list of chunks after the upload), encrypted metadata (e.g., encrypted metadata 216) for the data, and/or a digital signature (e.g., digital signature 232) from the client uploading the data. The previous and current states may also have special values representing "deleted," "directory," and "empty file." Synchronization server 206 may add a timestamp to the commit record and combine multiple commit records into a change set (e.g., change set 240).

Prior to storing the change set in cloud storage system 202, synchronization server 206 may include an identifier for the volume, a change set identifier (e.g., a sequential numeric identifier) for the change set, and a timestamp in the change set. Synchronization server 206 may also add a digital signature and/or digital certificate 224 for the entire change set. The signing of individual commit records and the entire change may allow clients 208-210 to detect tampering of either the commit records or change set. Moreover, the inclusion of the volume identifier and change set identifier in the signed change set may prevent replacement attacks across volumes and/or on change sets within the same volume. The change set may further include a list of recently revoked users and/or clients from management server 204 to facilitate rapid notification of remaining clients of updates to access control policy 226 for the volume.

The change set may then be added to a log for the volume in cloud storage system 202. In turn, a history containing a linearly ordered list of commits from a given start version to a given end version of a file and/or volume may be obtained from the change set and/or other change sets in the log. Within the history, each commit record may be labeled with the digital certificate of the corresponding client, a commit identifier (e.g., sequential numeric identifier), and/or a change set identifier that can be used to retrieve versioned chunk data from cloud storage system 202.

Synchronization server 206 may also be effectively stateless. For example, synchronization server 206 may keep a local database of change sets and/or commit records (e.g., commit records 242) for efficiency, but the state of synchronization server 206 may be reconstructed based on change sets and/or other encrypted metadata 216 in cloud storage system 202. Because synchronization server 206 may be untrusted, synchronization server 206 may be unable to decrypt or forge data on cloud storage system 202.

As mentioned above, synchronization server 206 may act as the coordination and distribution point for a volume (e.g., volume 212). Clients (e.g., clients 208-210) interested in receiving updates related to the volume may have a persistent connection with synchronization server 206 for the volume. For example, the clients may use a long poll technique to listen for changes from synchronization server 206. As a result, synchronization server 206 may support a large number of open, idle connections, notify clients of volume updates, track the current state of each file in the volume, and/or support a "compare-and-swap" primitive on file states, so that the file states may be updated without race conditions. To track the current state of each file and support the "compare-and-swap" primitive, synchronization server 206 may maintain a local database separately from change sets uploaded to cloud storage system 202.

To facilitate efficient storage of change sets in cloud storage system 202, synchronization server 206 may periodically collapse multiple change sets into a single change set and sign the new, collapsed change set. The collapsed change set may contain a snapshot of the current state of the corresponding volume. New clients and/or clients that have not connected for a long time may download the collapsed change set in lieu of downloading all prior change sets. Synchronization server 206 may also periodically remove old change sets that only refer to old versions of files, which are no longer accessible.

Management server 204 may be a trusted server that runs within an internal (e.g., corporate) network of the organization. Management server 204 may be the root of trust for the system by acting as a private certificate authority, signing digital certificates 224 (e.g., X.509 certificates) for other components of the system, and/or signing access control lists (e.g., in access control policy 226) for volumes (e.g., volume 212) in cloud storage system 202. Management server 204 may also provide administrators a central point for control and reporting, act as the source of an access control policy 226 for the organization, and/or hold keys 222 for encrypting and signing data 220 and/or metadata 218 associated with clients 208-210 and/or cloud storage system 202.

For example, management server 204 may run in a web application deployed within the organization. Management server 204 may be accessible by clients (e.g., clients 208-210) outside the organization's corporate network via a reverse proxy server. Management server 204 may also interface with an existing directory server and authentication system within the organization, such as Active Directory. Once a client (e.g., clients 208-210) has acquired the public certificate authority (CA) certificate of management server 204 and a signed digital certificate for the client's key, the client only needs to contact management server 204 to acquire additional permissions and/or check certificate revocation lists.

In one or more embodiments, private keys are generated on each client 208-210 and never shared. For example, a laptop computer and a tablet belonging to the same user may each generate its own key and obtain a separate digital certificate from management server 204, and management server 204 may authorize both keys to all volumes to which the user has access. Thus, if a single client is lost or determined to have been compromised, the client's access can be revoked and any changes made by the client can be reverted without affecting the user's use of other clients.

In addition, synchronization server 206 may be paired with management server 204 by presenting the public key of synchronization server 206 for management server 204 to sign. Synchronization server 206 and management server 204 may also negotiate a shared secret that is used to encrypt settings and parameters for a particular volume, which is provided as an access control policy (e.g., access control policy 226) to a client associated with the volume. The client may then provide the access control policy to synchronization server 206 during authentication with synchronization server 206, and synchronization server 206 may enforce the access control policy for the client.

If the access control policy for a particular volume has been modified by an administrator, a client (e.g., clients 208-210) with access to the volume may download a new copy of the access control policy with a digital signature from management server 204. The client may use the new access control policy to authenticate with synchronization server 206, and synchronization server 206 may enforce the new access control policy (e.g., by enforcing read-only access, enforcing a hard quota limit, etc.).

For each volume, management server 204 may distribute multiple symmetric keys (e.g., keys 222) to authorized clients. The symmetric keys may include a data key that is used to encrypt data 220 on client 208 and decrypt encrypted data 214 on volume 212. Along the same lines, a symmetric metadata key may be used to encrypt metadata 218 and decrypt encrypted metadata 216. A different data and metadata key may be used to encrypt and decrypt data and metadata in each volume, respectively. Data and metadata keys may be separated to allow clients to read directory listings without reading file contents (e.g., by providing the clients only with metadata and path HMAC keys). Separation of keys for data and metadata is described in a co-pending non-provisional application by inventors Geoffrey Thomas, John Whaley and Thomas Joseph Purtell II, entitled "Separate Cryptographic Keys for Protecting Different Operations on Data," having Ser. No. 12/729,370 and filing date 28 Dec. 2012, which is incorporated herein by reference.

The symmetric keys may also include a data HMAC key used to compute hash names for content-addressable storage of encrypted data 214, as well as a path HMAC key used to compute hashes for file paths. A unique data HMAC key may be used with each cloud storage system 202 (e.g., cloud storage backend), and a unique path HMAC key may be used with each volume.

Finally, management server 204 may provide a symmetric certificate key that is used to encrypt digital certificates 224. Because digital certificates 224 may include identifiable information, the certificate key may prevent attackers from obtaining the information.

Management server 204 may also facilitate the use of public keys of a number of public/private key pairs. The public/private key pairs may include management server keys, which may be used by management server 204 to sign digital certificates 224 as a certificate authority. The management server keys may also be used to sign access control policy 226 and/or revocation requests. The public/private key pairs may additionally include synchronization server keys, which may be used by synchronization server 206 to sign change sets before pushing the change sets into logs on cloud storage system 202. Finally, the public/private key pairs may include client keys, which may be used by clients 208-210 to sign commit records (e.g., commit records 242) before providing the commit records to synchronization server 206 and/or uploading the corresponding chunks of encrypted data 214 to cloud storage system 202.

Clients 208-210 may synchronize data on local filesystems of clients 208-210 with cloud storage system 202 and/or synchronization server 206. Each client may authenticate with management server 204, encrypt and upload data (e.g., data 220) to cloud storage system 202, and send commit records associated with the uploaded data to synchronization server 206 to record file changes. The client may also listen for change notifications from synchronization server 206, download signed change sets (e.g., change set 240) and new file contents from cloud storage system 202, and handle conflicts between the client's local data state and cloud storage system 202. Alternatively, clients 208-210 may communicate with one another to detect and obtain the latest change sets, thus allowing clients 208-210 to detect and/or handle a malicious synchronization server 206.

More specifically, each client may maintain a local database of volumes, trusted certificates, bindings, and synchronization states of files. The client may also include an uploader that uploads data (e.g., data 220) to cloud storage system 202, a log processor that synchronizes the local database with synchronization server 206, and a downloader that downloads data (e.g., encrypted data 214) from cloud storage system 202.

The uploader may scan the local filesystem to detect changes to relevant files (e.g., files to be synchronized with cloud storage system 202). A file may need to be uploaded if the file's current state on the local filesystem differs from the file's current state as recorded on cloud storage system 202 and/or synchronization server 206. The uploader may also apply a set of filters to determine if changes to the file prompt uploading of the file to cloud storage system 202.

For each file that needs to be uploaded, the uploader may acquire an opportunistic lock (oplock) on the file. Next, the uploader may calculate a chunk hash for each chunk of the file (e.g., using the data HMAC key) and check for the chunk's existence on cloud storage system 202. If the chunk already exists on cloud storage system 202, the uploader may skip uploading of the chunk. If the chunk does not exist on cloud storage system 202, the uploader may encrypt, optionally compress, and upload the chunk to cloud storage system 202. After successfully uploading a set of chunks for one or more files, the uploader may send a list of commit records for the uploaded chunks to synchronization server 206.

Synchronization server 206 may verify that the previous state in each commit record matches the corresponding current state in the local database of synchronization server 206. If the two states match, the commit succeeds. If the states do not match, the commit fails. For each commit, synchronization server 206 may generate a response notifying the uploader of the acceptance or rejection of the commit.

For each accepted commit, the uploader may update the corresponding file's synchronization state in the local database to reflect the successful upload. For example, the uploader may update the file's current state in the local database to the current state in the commit record. For each rejected commit, the uploader may rename the file on the local filesystem and check for a new version of the file on cloud storage system 202, thus resolving a conflict between two different versions of the file. For example, the uploader may include the name of the client and a timestamp in the renamed local file to facilitate identification of the file. The uploader may also add the file's original path to a download queue on the client to trigger downloading of the other version of the file from cloud storage system 202.

The log processor may update the client's local database based on relevant change sets. For example, the log processor may create and initialize new objects representing files to be synchronized, which have not been seen before. The log processor may also set the current state of each file, as shown in the most recent change set(s) for the file. Finally, the log processor may mark the last change seen from synchronization server 206.

The log processor may periodically check with synchronization server 206 for the latest change sets (e.g., using a long polling technique). If new change sets are available, the log processor may download each change set individually and use the change set to perform an update transaction on the client's local database. The log processor may also enqueue the list of files in the change set in the download queue.

As mentioned above, change sets may be identified by sequential numeric identifiers to allow the log processor to fetch a list of available change sets from cloud storage system 202 using one request with the appropriate numeric marker. If the client becomes too far out-of-date with cloud storage system 202, the log processor may process the change sets into a new database and compare the new and old databases to find files that were deleted between the last change set processed by the client and the collapsed change set.

The downloader may pull downloads off the download queue and perform downloads of the corresponding files. A file may need to be downloaded if the file's last recorded state in the database is different from the current state described in the most recent change sets and/or if the file doesn't already exist with the correct hash. To download the file, the downloader may query cloud storage system 202 for chunks of encrypted data (e.g., encrypted data 214) that make up the file. The downloader may also spawn threads to query other clients in the local network for the chunks, thus acting as a node in a peer-to-peer network composed of all the clients in the local network. Direct downloading of chunks from other clients may reduce use of the external link to cloud storage system 202 and enable file exchange in case cloud storage system 202 fails. To enable such peer-to-peer functionality, synchronization server 206 and/or management server 204 may track the clients and periodically announce the addresses and ports of each client to other clients in the same local network.

After a chunk is downloaded, the downloader may decrypt the chunk into decrypted data 230 and/or decrypted metadata 228 and generate a verification (e.g., verifications 236-238) of the corresponding digital signature. The downloader may then perform a hash check on the entire file to ensure the file's integrity before writing the file to the file's path on the local filesystem.

The downloader may also detect an existing version of the file before writing the downloaded data to the file. If an existing version of the file is found, the downloader may open the existing version with exclusive write access to prevent other processes from modifying the existing version. If opening with exclusive write access fails (e.g., if the file is already being used by another process), download of the file is re-enqueued after a short delay. Once the existing version is opened exclusively, the downloader may obtain one or more file attributes of the existing version and check to see if the file attribute(s) have changed. If the file attributes have not changed, the existing version is replaced with the new, downloaded set of data. If the file attributes have changed, the download may be placed back in the download queue, and any conflict between the existing version and the downloaded version from cloud storage system 202 may be resolved by the uploader, as described above.

The client may also split commit operations and/or records into deltas on chunk data and apply the deltas as patches (e.g., to resolve multiple updates to a file). A client with sufficient security privileges (e.g., an administrator) may also use the history of a file or volume to rebuild new versions out of individual changes. Such functionality may be used to erase file corruption committed by a "rogue" client, for example.

By encrypting and verifying file data and metadata, the system of FIG. 2 may facilitate safe use of commodity cloud storage. In addition, the use of individual clients (e.g., clients 208-210) to encrypt, decrypt, upload, and download the data may avert bandwidth issues associated with routing traffic with the cloud storage through a central, trusted server. Finally, a scalable, untrusted synchronization server 206 may be used to resolve multiple concurrent updates to the data and push updates and/or notifications to the clients.

Figure 3:
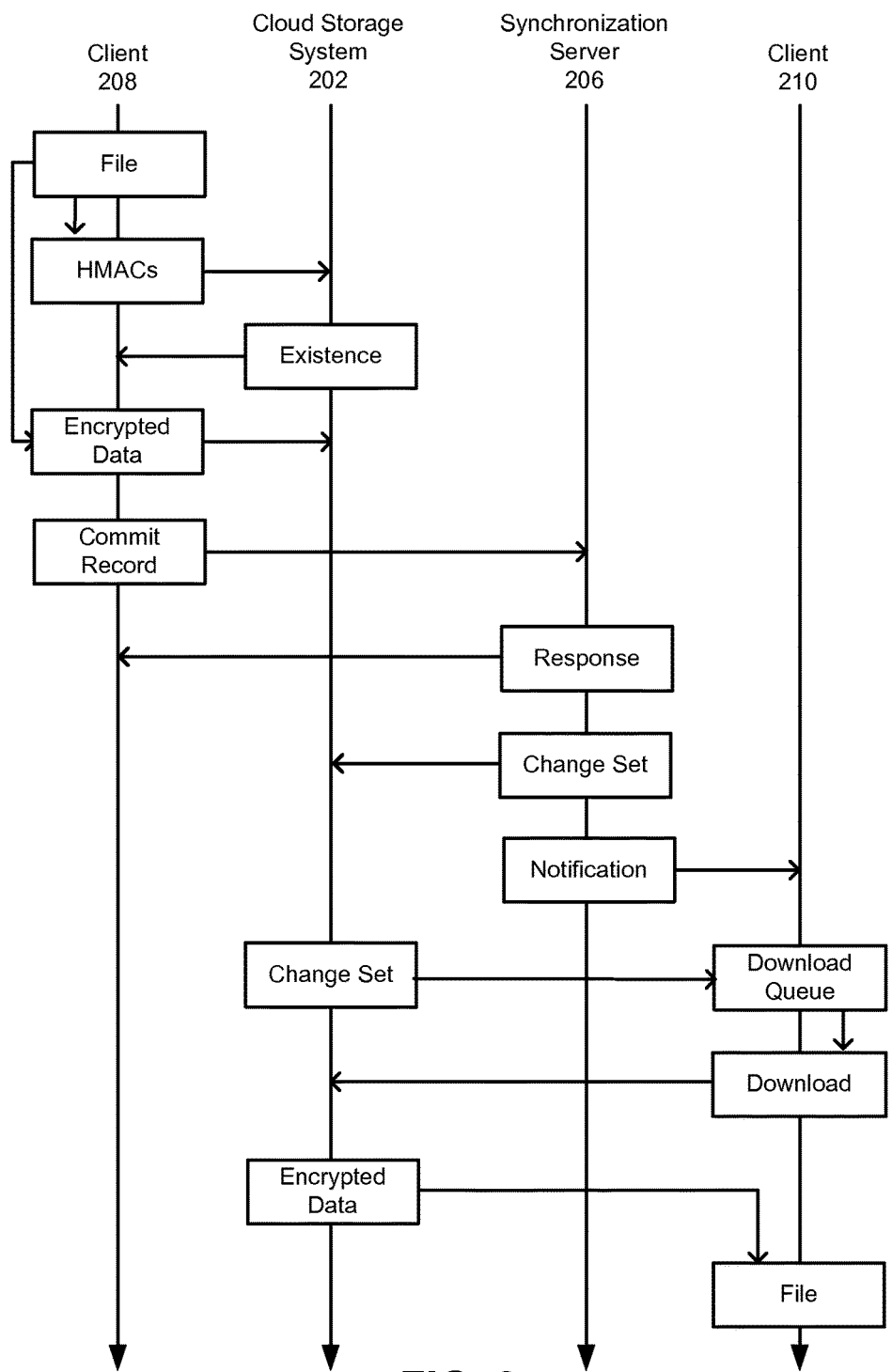
FIG. 3 shows the use of a cloud storage system and synchronization server to synchronize data between two clients in accordance with the disclosed embodiments.

FIG. 3 shows the use of cloud storage system 202 and synchronization server 206 to synchronize data between two clients 208-210 in accordance with the disclosed embodiments. First, client 208 may notice a change in a file, which may trigger the upload of the file to cloud storage system 202. For example, client 208 may detect the change in the file based on user input and/or by monitoring the local filesystem. A filter may also be applied to determine if the changes require uploading of the file to cloud storage system 202. For example, changes to backup files and/or thumbnail files associated with the file may be ignored, while changes to the contents of the file may require uploading of the file to cloud storage system 202.

Next, client 208 may split the file into chunks and compute a set of HMACs from the chunks. For example, client 208 may use a data HMAC key from a management server (e.g., management server 204 of FIG. 2) to calculate a hash name for content-addressable storage of each chunk. Client 208 may then provide the hash name to cloud storage system 202 to determine if the chunk exists on cloud storage system 202. If the chunk exists, client 208 may omit encrypting and/or uploading of the chunk. If the chunk does not exist, client 208 may encrypt the chunk using a data key from the management server and upload the chunk to cloud storage system 202.

After uploading new chunks for the file, client 208 may generate a commit record for the uploaded chunks and transmit the commit record to synchronization server 206. The commit record may include the HMAC of the file's path, previous and current states of the file (e.g., as lists of chunks in cloud storage system 202), metadata for the file, and/or a digital signature from client 208.

Synchronization server 206 may generate a response to the commit record based on a comparison of the previous state in the commit record with the file's current state in the database maintained by synchronization server 206. If the previous state in the commit record matches the current state in the database, synchronization server 206 may use the response to confirm a successful commit with client 208 and add a timestamp to the commit record. If the previous state in the commit record does not match the current state in the database, synchronization server 206 may use the response to notify client 208 of a conflict between versions of the file on client 208 and on cloud storage system 202. Client 208 may resolve the conflict by renaming the local version of the file and downloading the other version from cloud storage system 202.

Synchronization server 206 may also transmit a "retry later" response to client 208 if synchronization server 206 is too busy to handle the commit record from client 208. In turn, client 208 may retransmit the commit record to synchronization server 206 after a pre-specified period, and synchronization server 206 may provide a second response to the retransmitted commit record. Client 208 may continue transmitting the commit record until synchronization server 206 is able to process the commit record and respond with a successful commit or a conflict.

Synchronization server 206 may then create a change set containing the commit record and other commit records associated with the same volume. The change set may further include an identifier for the volume, a change set identifier (e.g., a sequential numeric identifier) for the change set, a digital signature from the synchronization server, and a timestamp. Synchronization server 206 may upload the change set to cloud storage system 202 and transmit a notification (e.g., a push notification) of an update to the volume to client 210 and/or other clients with access to the volume.

After receiving the notification, client 210 may obtain the change set from cloud storage system 202 and verify a set of signatures in the change set (e.g., from synchronization server 206 and/or clients associated with commit records in the change set). Client 210 may also use the commit records to update a local data state of data on client 210 and enqueue a set of files associated with the commit records in a download queue, including the file uploaded by client 208. Next, client 210 may obtain the download of the file from the download queue and request chunks for the file from cloud storage system 202, client 208, and/or other clients on the same local network. Client 210 may receive the chunks as encrypted data, decrypt and verify the chunks, and write the chunks to a file on a local filesystem.

Client 210 may also detect an existing version of the file in the local filesystem. If the existing version is detected, client 210 may open the existing version with exclusive write access and obtain one or more file attributes for the existing version. If the file attribute(s) have not changed, client 210 may replace the existing version with the first set of data because the existing version has not changed since the existing version was previously uploaded to and/or downloaded from cloud storage system 202. If the file attribute(s) have changed, client 210 may place the download back in the download queue to prevent overwriting of recent changes to the existing version. The conflict between the existing version and the version uploaded by client 210 may then be resolved by an uploader on client 210, which may rename the existing version and download the version uploaded by client 208 after attempting to commit an upload of the existing version and receiving a notification of a conflict from synchronization server 206.

Figure 4:
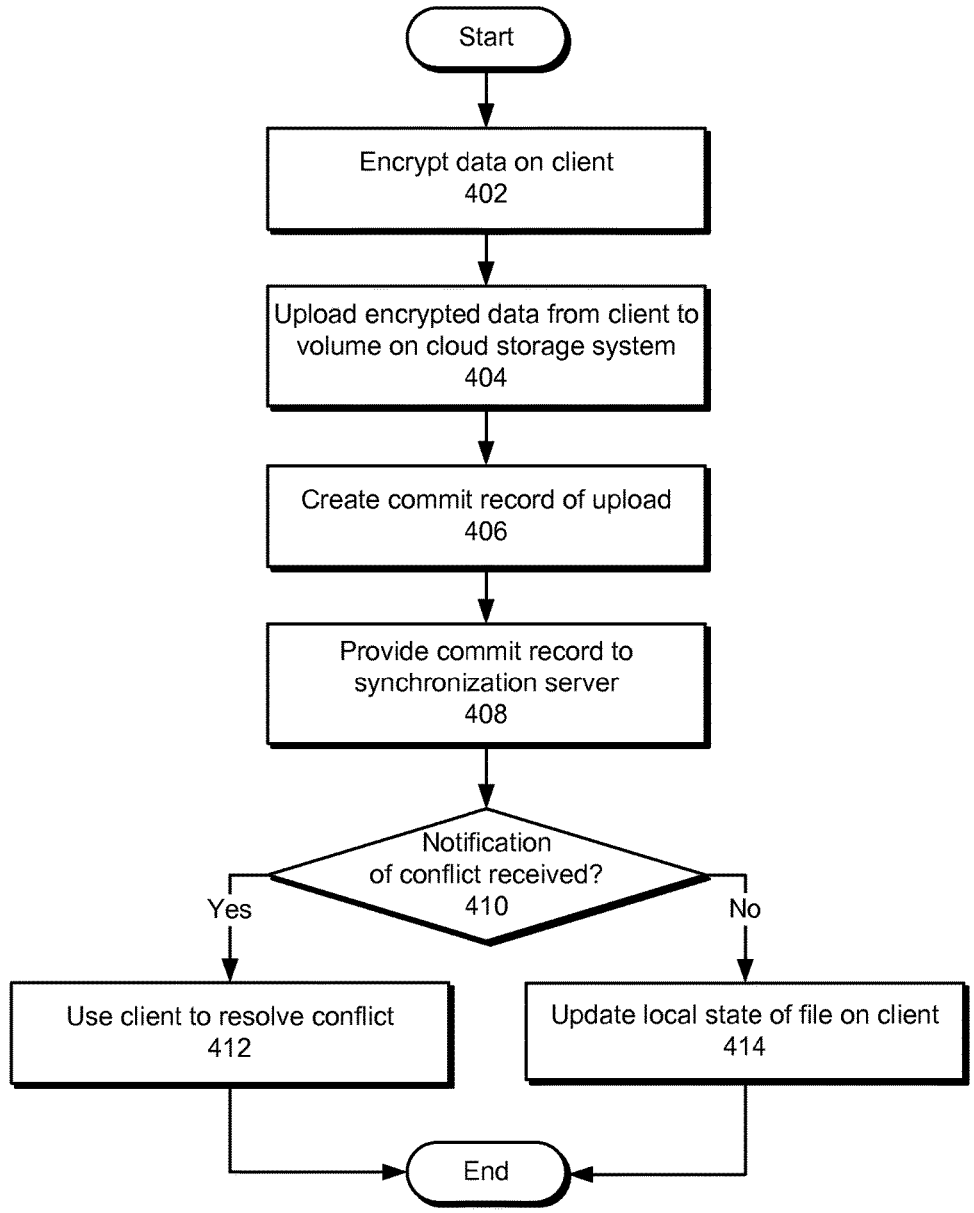
FIG. 4 shows a flowchart illustrating the process of uploading data from a client to a cloud storage system in accordance with the disclosed embodiments.

FIG. 4 shows a flowchart illustrating the process of uploading data from a client to a cloud storage system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, the data is encrypted on the client (operation 402). For example, the data may be split into a set of chunks, and each chunk may be encrypted. Next, the encrypted data is uploaded from the client to a volume on the cloud storage system (operation 404). Prior to encrypting and/or uploading the data, an HMAC of each chunk may be calculated and used to determine an existence of the chunk on the cloud storage system. If the chunk already exists on the cloud storage system, the chunk is not uploaded. If the chunk does not exist on the cloud storage system, the chunk is uploaded.

After the data is uploaded, a commit record of the upload is created (operation 406) by the client and provided to a synchronization server (operation 408). The commit record may include the HMAC of the file's path, previous and current states of the file (e.g., as lists of chunks in the cloud storage system), metadata for the file, and/or a digital signature from the client. The synchronization server may provide a response to the commit record, which may include a notification of a conflict (operation 410) between the uploaded data and another set of data chunks (e.g., for a different version of the file) on the cloud storage system. If no such notification is received, the response may indicate a successful commit, and the local data state of the file on the client is updated (operation 414) to reflect the current state in the commit record.

If a notification of a conflict is received, the client is used to resolve the conflict (operation 412). For example, the client may rename the local version of the file and download the differing version of the file from the cloud storage system to a local filesystem. The client may then reattempt to upload the renamed file to the cloud storage system.

Figure 5:
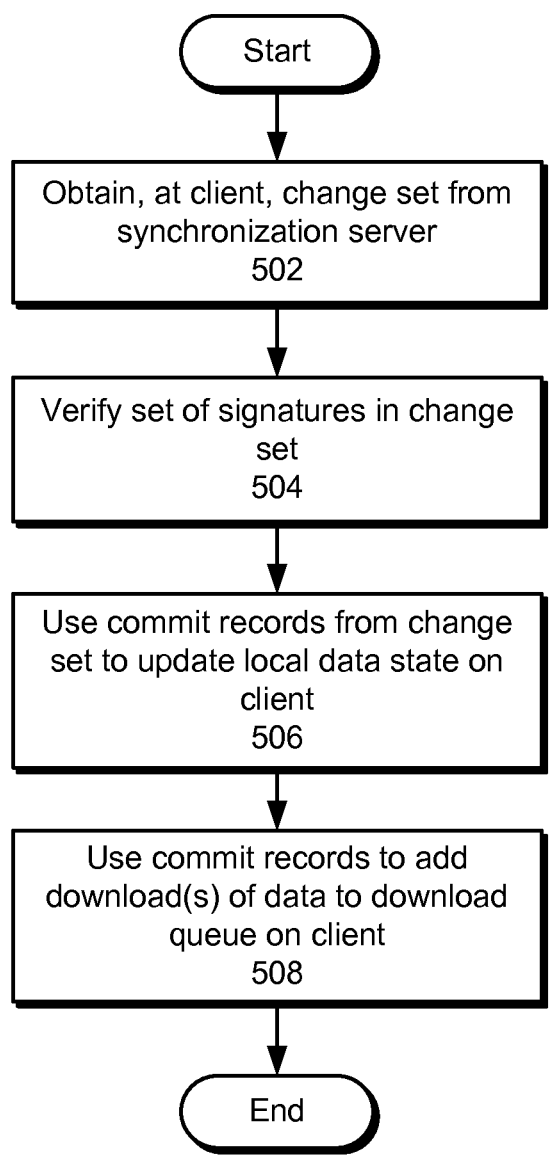
FIG. 5 shows a flowchart illustrating the process of synchronizing a local data state on a client with a synchronization server in accordance with the disclosed embodiments.

FIG. 5 shows a flowchart illustrating the process of synchronizing a local data state on a client with a synchronization server in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, the client obtains a change set from a synchronization server (operation 502). The change set may include a set of commit records for a volume to which the client has access, an identifier for the volume, a change set identifier (e.g., a sequential numeric identifier), a digital signature from the synchronization server, and/or a timestamp. Next, the client verifies a set of signatures in the change set (operation 504). For example, the client may verify a digital signature of the synchronization server on the entire change set, as well as individual signatures on commit records by clients from which the commit records were received.

After the signatures are verified, the client may use the commit records to update the local data state on the client (operation 506) and add one or more downloads of data (e.g., files) associated with the commit records to a download queue (operation 508). Downloads in the download queue may then be processed by performing the downloads, as described in further detail below with respect to FIG. 6.

Figure 6:
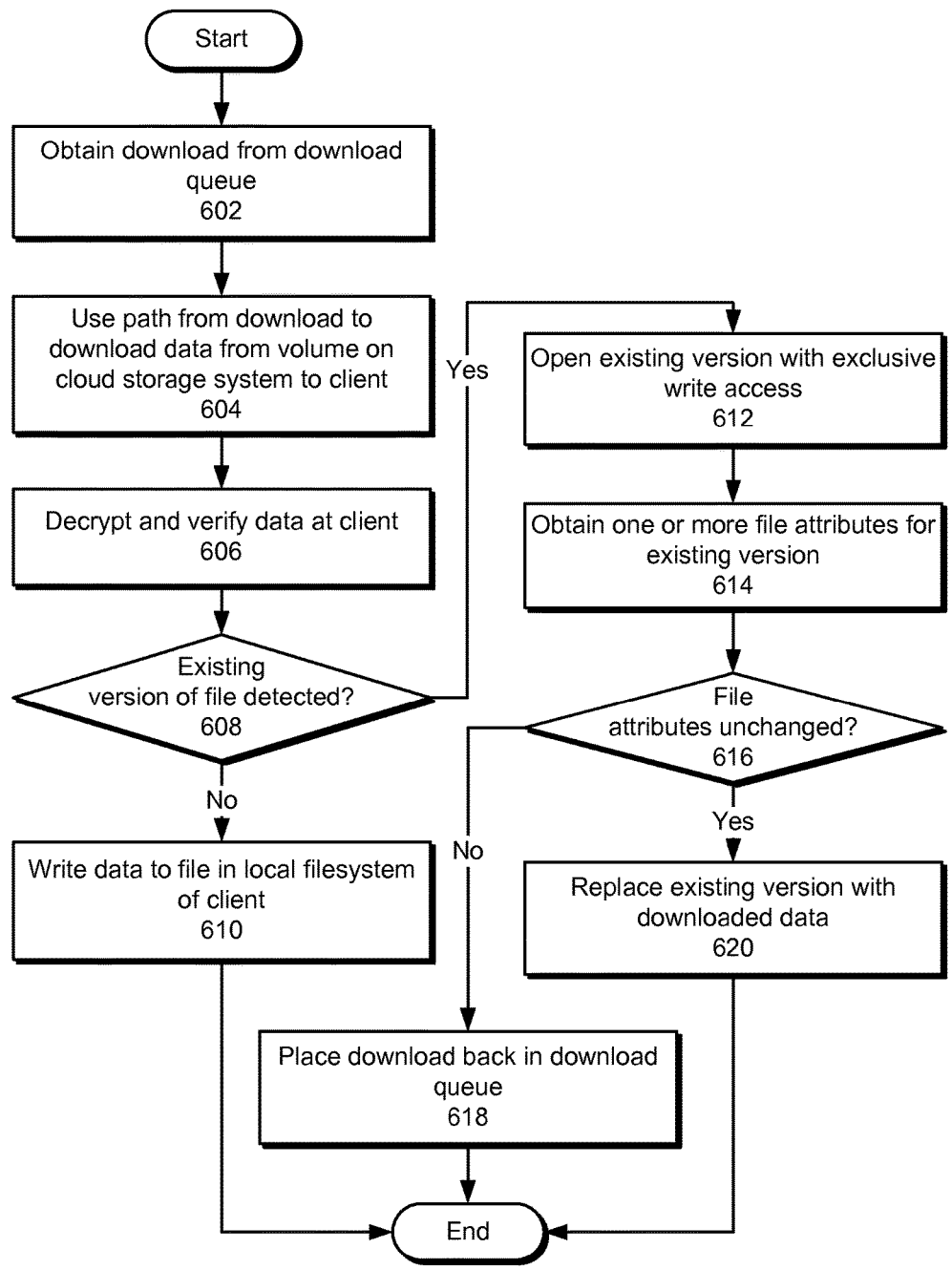
FIG. 6 shows a flowchart illustrating the process of downloading data from a cloud storage system to a client in accordance with the disclosed embodiments.

FIG. 6 shows a flowchart illustrating the process of downloading data from a cloud storage system to a client in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

First, the client obtains a download from a download queue (operation 602) and uses a path from the download to download data from a volume on the cloud storage system (operation 604). The client may also request some or all of the data (e.g., as one or more data chunks) from other clients in the same local network. Next, the client decrypts and verifies the data (operation 606). For example, the client may check signatures associated with the data and/or perform a hash check on the entire set of data (e.g., a file).

The client may then process the downloaded data based on the presence of an existing version of the file (operation 608) on the client's local filesystem. If the existing version is not detected (e.g., if the existing version has been moved and/or renamed), the data is written to the file in the local filesystem (operation 610).

If the existing version is detected, the existing version is opened with exclusive write access (operation 612), and one or more file attributes for the existing version are obtained (operation 614) to determine if the file attribute(s) have changed (operation 616). If the file attributes have changed, the download is placed back in the download queue (operation 618) for subsequent processing, and the conflict between the existing version and the downloaded version may be handled during uploading of the existing version, as described above. If the file attributes have not changed, the existing version is replaced with the downloaded data (operation 620) because the existing version has not been modified since the existing version was last uploaded to the cloud storage system and/or downloaded from the cloud storage system.

Figure 7:
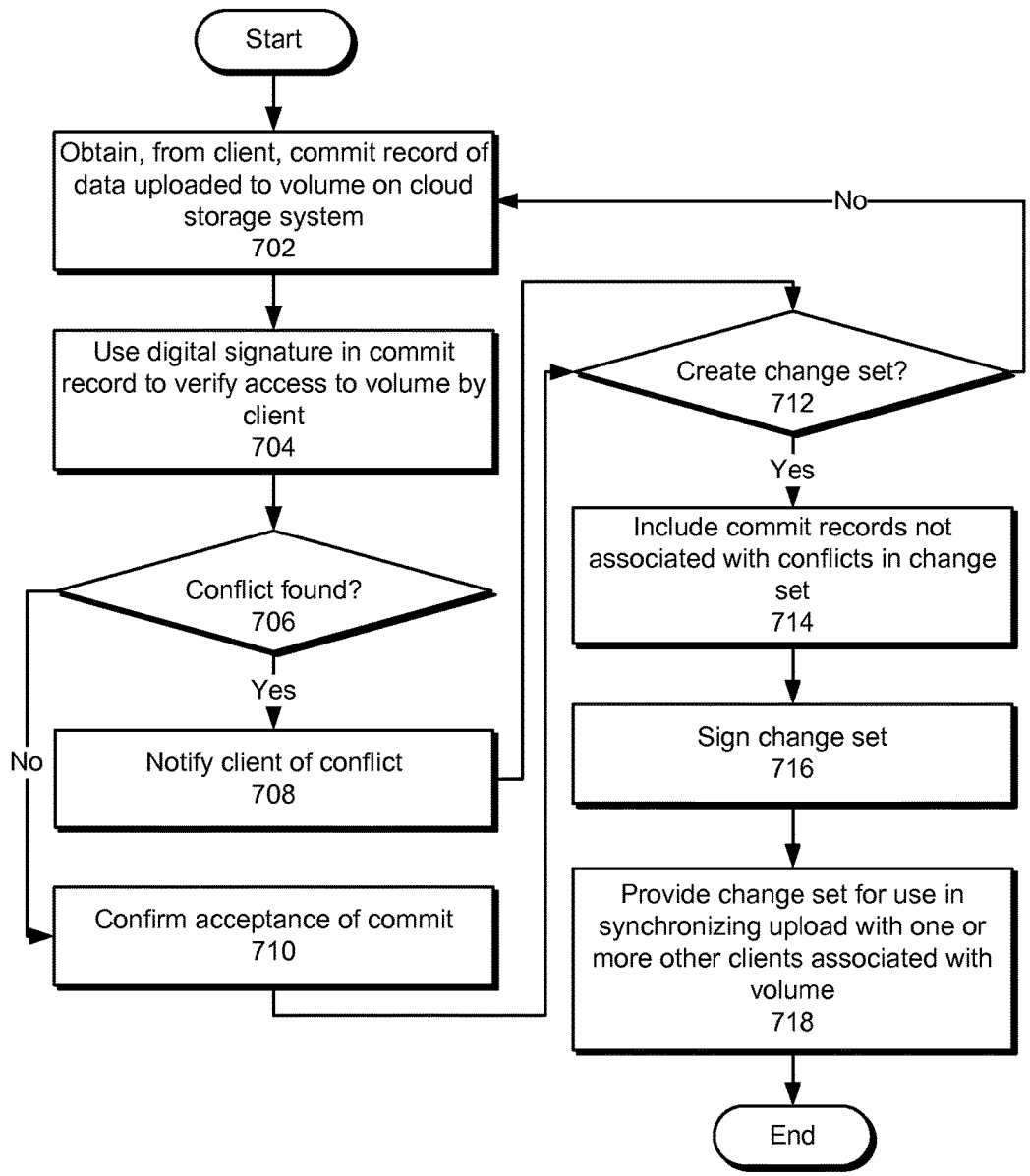
FIG. 7 shows a flowchart illustrating the process of synchronizing data in accordance with the disclosed embodiments.

FIG. 7 shows a flowchart illustrating the process of synchronizing data in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the technique.

Initially, a commit record of data uploaded to a volume on a cloud storage system is obtained from a client (operation 702). Next, a digital signature in the commit record is used to verify access to the volume by the client (operation 704). For example, a digital certificate and/or an access control policy associated with the digital signature may be used to verify the client's access to the volume and/or enforce quotas associated with the client's access to the volume. After the client is verified, a timestamp is added to the commit record.

A conflict may be found (operation 706) between the uploaded data and existing data in the volume. For example, the uploaded data may conflict with existing data in the volume if the previous state of the commit record does not match the current state of the existing data in the volume. If no conflict is found, acceptance of the commit is confirmed (operation 710) with the client (e.g., by transmitting a response confirming a successful commit to the client), and a timestamp is added to the commit record. If a conflict is found, the client is notified of the conflict (operation 708), and the conflict is handled by the client.

A change set may be created (operation 712) from the commit record and/or other commit records. For example, the change set may be created after a pre-specified number of commit records have been received and/or a pre-specified period has passed. If creation of the change set is to be delayed, additional commit records may be obtained and verified (operations 702-704), and conflicts between uploaded data associated with the commit records and existing data on the volume may be detected and managed (operations 706-710).

If the change set is to be created, commit records not associated with conflicts are included in the change set (operation 714), along with a timestamp, an identifier for the volume, and a change set identifier. The entire change set is then signed (operation 716), and the signature is included in the change set. Finally, the completed change set is provided for use in synchronizing the upload with one or more other clients associated with the volume (operation 718). For example, the change set may be uploaded to the cloud storage system, and a notification of the change set may be sent to the other client(s). The notification may be used by the other client(s) to download the change set and data associated with the change set from the cloud storage system, as described above.

Figure 8:
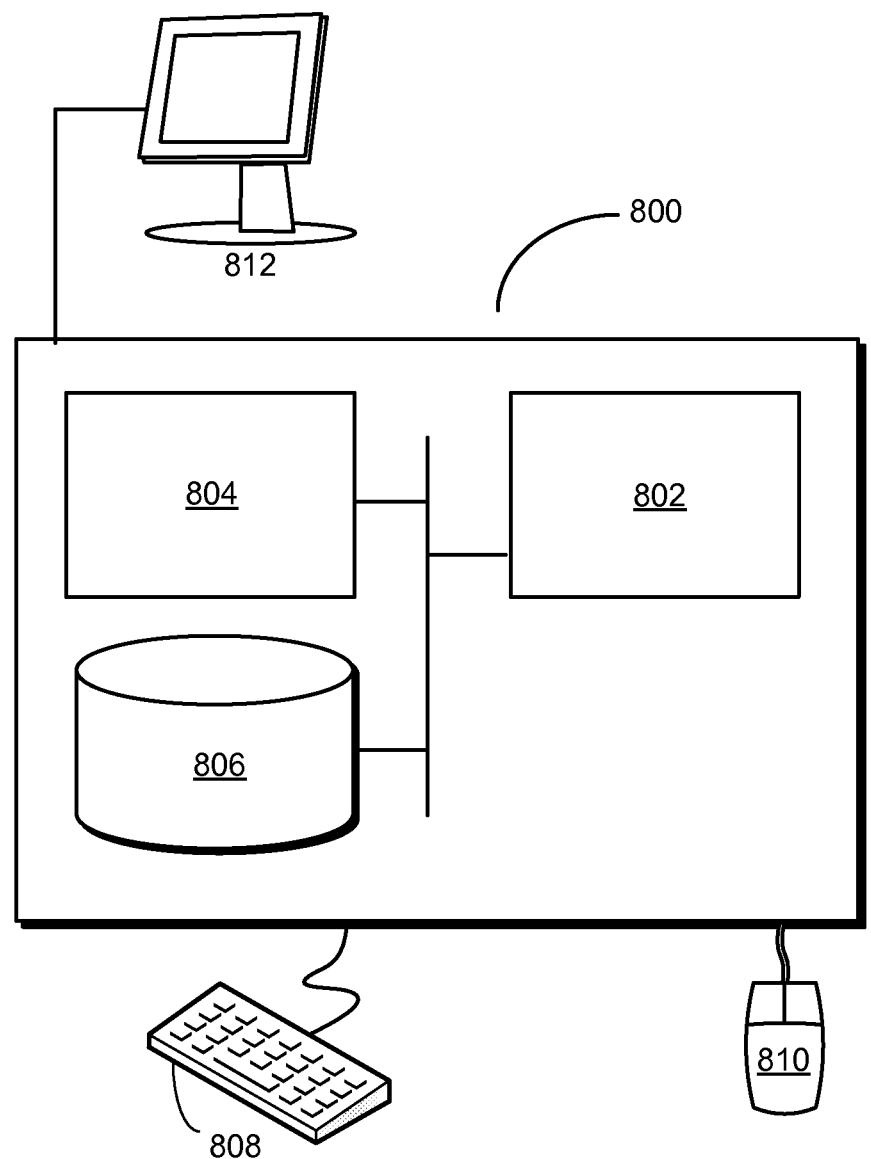
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for processing data. The system may include a first client that encrypts a first set of data, uploads the encrypted first set of data to a volume on a cloud storage system, and creates a commit record of the upload. The system may also include a synchronization server that verifies access to the volume by the first client and includes the commit record in a change set containing a set of commit records associated with the volume. The synchronization server may additionally sign the change set and provide the change set for use in synchronizing the upload with a second client.

The system may further include the second client, which obtains the signed change set from the synchronization server and verifies a set of signatures in the change set. Next, the second client may use the commit record from the change set to update a local data state and add a download of the first set of data to a download queue. The second client may then obtain the download from the download queue, use a path from the download to download the encrypted first set of data from the volume, decrypt and verify the first set of data, and write the first set of data to a file on a local filesystem.

Finally, the system may include a management server that provides a set of digital certificates for validating a set of keys used by the first client and the synchronization server and an access control policy associated with access to the volume by the first and second clients. The keys may include a first key used by the first client to encrypt the data and a second key used by the synchronization server to sign the change set.

In addition, one or more components of computer system 800 may be remotely located and connected to the other components over a network. Portions of the present embodiments (e.g., clients, synchronization server, management server, etc.) may also be located on different nodes of a distributed system that implements the embodiments. For example, the present embodiments may be implemented using a cloud computing system and/or one or more trusted components that enable safe use of a third-party cloud storage system without routing traffic to and from the cloud storage system through a central server.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system, comprising:
a first client configured to:
encrypt a first set of data;
upload the encrypted first set of data to a volume on a cloud storage system; and
create a commit record of the upload, wherein the commit record comprises:
a hash-based message authentication code (HMAC) of a path associated with the data;
a previous state of the data;
a current state of the data;
metadata for the data;
a digital signature from the first client; and
a timestamp; and
a synchronization server configured to:
include the commit record in a change set comprising a set of commit records associated with the volume; and
provide the change set for use in synchronizing the upload with a second client.

2. The system of claim 1, further comprising:
the synchronization server configured to sign the change set; and
the second client configured to:
obtain the signed change set from the synchronization server;
verify a set of signatures in the change set;
use the commit record from the change set to update a local data state; and
use the commit record to add a download of the first set of data to a download queue.

3. The system of claim 2, wherein the second client is further configured to:
obtain the download from the download queue;

use a path from the download to download the encrypted first set of data from the volume;
decrypt and verify the first set of data; and
write the first set of data to a file on a local filesystem.

4. The system of claim 3, wherein the second client is further configured to:
upon detecting an existing version of the file on the local filesystem:
open the existing version with exclusive write access;
obtain one or more file attributes for the existing version;
if the one or more file attributes have not changed, replace the existing version with the first set of data; and
if the one or more file attributes have changed, place the download back in the download queue.

5. The system of claim 2, further comprising:
a management server configured to:
provide a set of digital certificates for validating a set of keys used by the first client and the synchronization server; and
provide an access control policy associated with access to the volume by the first and second clients.

6. The system of claim 5, wherein the set of keys comprises:
a first key used by the first client to encrypt the data; and
a second key used by the synchronization server to sign the change set.

7. The system of claim 1:
wherein the synchronization server is further configured to notify the first client of a conflict between the uploaded first set of data and a second set of data in the volume, and
wherein the first client is further configured to resolve the conflict.

8. The system of claim 7, wherein resolving the conflict involves:
downloading the second set of data from the cloud storage system to a local filesystem; and
renaming the first set of data in the local filesystem.

9. The system of claim 1, wherein the synchronization server is configured to verify access to the volume by the first client.

10. The system of claim 1, wherein the change set comprises:
a set of signed commit records;
an identifier for the volume;
a change set identifier;
a digital signature from the synchronization server; and
a timestamp.

11. A computer-implemented method, comprising:
encrypting a first set of data on a first client;
uploading the encrypted first set of data from the first client to a volume on a cloud storage system;
creating a commit record of the upload, wherein the commit record comprises:
a hash-based message authentication code (HMAC) of a path associated with the data;
a previous state of the data;
a current state of the data;
metadata for the data;
a digital signature from the first client; and
a timestamp; and
providing the commit record to a synchronization server.

12. The computer-implemented method of claim 11, further comprising:
receiving, at the first client, a notification of a conflict between the uploaded first set of data and a second set of data on the cloud storage system from the synchronization server; and
using the first client to resolve the conflict.

13. The computer-implemented method of claim 12, wherein using the first client to resolve the conflict involves:
downloading the second set of data from the cloud storage system to the first client; and
renaming the first set of data on the first client.

14. The computer-implemented method of claim 11, further comprising:
obtaining, at the first client, a change set from the synchronization server, wherein the change set comprises one or more commit records from one or more other clients associated with the volume;
verifying a set of signatures in the change set;
using the one or more commit records to update a local data state on the first client; and
using the one or more commit records to add a download of a second set of data to a download queue on the first client.

15. The computer-implemented method of claim 14, further comprising:
obtaining the download from the download queue;
using a path from the download to download the second set of data from the volume to the first client;
decrypting and verifying the second set of data at the first client; and
writing the second set of data to a file in a local filesystem of the first client.

16. The computer-implemented method of claim 15, further comprising:
upon detecting an existing version of the file on the local filesystem:
opening the existing version with exclusive write access;
obtaining one or more file attributes for the existing version;
if the one or more file attributes have not changed, replacing the existing version with the second set of data; and
if the one or more file attributes have changed, placing the download back in the download queue.

17. A computer-implemented method, comprising:
obtaining, from a first client, a commit record of data uploaded to a volume on a cloud storage system, wherein the commit record comprises:
a hash-based message authentication code (HMAC) of a path associated with the data;
a previous state of the data;
a current state of the data;
metadata for the data;
a digital signature from the first client; and
a timestamp;
using the digital signature in the commit record to verify access to the volume by the first client;
including the commit record in a change set; and
signing the change set.

18. The computer-implemented method of claim 17, further comprising notifying the first client of a conflict between the uploaded data and existing data in the volume.

19. The computer-implemented method of claim 17, further comprising providing the change set for use in synchronizing the upload with a second client associated with the volume.

20. The computer-implemented method of claim 17, wherein the change set comprises:

a set of signed commit records;
an identifier for the volume;
a change set identifier;
a digital signature from the synchronization server; and
a timestamp.

21. A non-transitory computer-readable storage medium storing instructions that when executed by a computer cause the computer to perform:
   encrypting a first set of data on a first client;
   uploading the encrypted first set of data from the first client to a volume on a cloud storage system;
   creating a commit record of the upload, wherein the commit record comprises:
      a hash-based message authentication code (HMAC) of a path associated with the data;
      a previous state of the data;
      a current state of the data;
      metadata for the data;
      a digital signature from the first client; and
      a timestamp; and
   providing the commit record to a synchronization server.

22. The non-transitory computer-readable storage medium of claim 21, the method further comprising:
   receiving, at the first client, a notification of a conflict between the uploaded first set of data and a second set of data on the cloud storage system from the synchronization server; and
   using the first client to resolve the conflict.

23. The non-transitory computer-readable storage medium of claim 21, the method further comprising:
   obtaining, at the first client, a change set comprising one or more commit records from one or more other clients associated with the volume;
   verifying a set of signatures in the change set;
   using the one or more commit records to update a local data state on the first client; and
   using the one or more commit records to add a download of a second set of data to a download queue on the first client.

24. The non-transitory computer-readable storage medium of claim 21, the method further comprising:
   obtaining the download from the download queue;
   using a path from the download to download the second set of data from the volume to the first client;
   decrypting and verifying the second set of data at the first client; and
   writing the second set of data to a file in a local filesystem of the first client.

25. The non-transitory computer-readable storage medium of claim 21, the method further comprising:
   upon detecting an existing version of the file on the local filesystem:
   opening the existing version with exclusive write access;
   obtaining one or more file attributes for the existing version;
   if the one or more file attributes have not changed, replacing the existing version with the second set of data; and
   if the one or more file attributes have changed, placing the download back in the download queue.

* * * * *